(12) United States Patent
Momo et al.

(10) Patent No.: US 12,299,023 B2
(45) Date of Patent: May 13, 2025

(54) DOCUMENT RETRIEVAL SYSTEM (71) Applicant: Semiconductor Energy Laboratory Co., Ltd., Atsugi (JP)

(72) Inventors: Junpei Momo, Sagamihara (JP); Hiromichi Godo, Isehara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 277 days.

(21) Appl. No.: 17/766,557

(22) PCT Filed: Oct. 14, 2020

(86) PCT No.: PCT/IB2020/059619
§ 371 (c)(1),
(2) Date: Apr. 5, 2022

(87) PCT Pub. No.: WO2021/079230
PCT Pub. Date: Apr. 29, 2021

(65) Prior Publication Data
US 2023/0026321 A1 Jan. 26, 2023

(30) Foreign Application Priority Data
Oct. 25, 2019 (JP) .................... 2019-194187

(51) Int. Cl.
*G06F 16/30* (2019.01)
*G06F 16/334* (2025.01)
(Continued)

(52) U.S. Cl.
CPC ........ *G06F 16/3347* (2019.01); *G06F 40/268* (2020.01); *G06F 40/284* (2020.01)

(58) Field of Classification Search
CPC .. G06F 16/3347; G06F 40/268; G06F 40/284; G06F 40/30
See application file for complete search history.

(56) References Cited

U.S. PATENT DOCUMENTS

2011/0270851 A1 11/2011 Mishina et al.
2013/0124525 A1* 5/2013 Anderson ............. G06F 16/278
707/737
(Continued)

FOREIGN PATENT DOCUMENTS

CN 102236693 A 11/2011
JP 2004-272352 A 9/2004
(Continued)

OTHER PUBLICATIONS

Machine Translation of JP 2014052863A, by Yabe, Published on Mar. 20, 2014 (Year: 2014).*
(Continued)

*Primary Examiner* — Mahesh H Dwivedi
(74) *Attorney, Agent, or Firm* — Eric J. Robinson; Robinson Intellectual Property Law Office, P.C.

(57) ABSTRACT

A document retrieval system that retrieves documents, with concepts of the documents taken into account, is provided. The document retrieval system (100) includes an input unit (101), a first processing unit (102), a storage unit (105), a second processing unit (103), and an output unit (104). The input unit (101) has a function of inputting a first document (20), the first processing unit (102) has a function of creating a first graph structure (21) from the first document (20), the storage unit (105) has a function of storing a second graph structure (11), the second processing unit (103) has a function of calculating a similarity between the first graph structure (21) and the second graph structure (11), the output unit (104) has a function of supplying information, the first processing unit (102) has a function of dividing the first document (20) into a plurality of tokens, a node and an edge of the first graph structure (21) have a label, and the label includes the plurality of tokens.

8 Claims, 8 Drawing Sheets

(51) Int. Cl.
*G06F 40/268* (2020.01)
*G06F 40/284* (2020.01)

(56) References Cited

U.S. PATENT DOCUMENTS

| | | | |
|---|---|---|---|
| 2014/0278362 A1* | 9/2014 | Gerken, III | G06F 16/367 |
| | | | 704/10 |
| 2016/0055196 A1* | 2/2016 | Collins | G06F 16/93 |
| | | | 707/690 |
| 2017/0262530 A1* | 9/2017 | Okura | G06F 16/3344 |
| 2018/0260474 A1* | 9/2018 | Surdeanu | G06F 40/279 |
| 2019/0005035 A1 | 1/2019 | Yamazaki et al. | |
| 2020/0349208 A1* | 11/2020 | Bajaj | G06F 16/951 |
| 2020/0409963 A1 | 12/2020 | Higashi et al. | |
| 2022/0004570 A1 | 1/2022 | Okano et al. | |

FOREIGN PATENT DOCUMENTS

| | | |
|---|---|---|
| JP | 2005-258624 A | 9/2005 |
| JP | 2011-233023 A | 11/2011 |
| JP | 2014-052863 A | 3/2014 |
| WO | WO-2020/240312 | 12/2020 |

OTHER PUBLICATIONS

Article entitled "Node Ranking in Labeled Directed Graphs", by Chitrapura et al., dated Nov. 13, 2004 (Year: 2004).*
Article entitled "Detecting Similar Programs via the Weisdeiler-Leman Graph Kernel", by Li et al., dated May 10, 2016 (Year: 2016).*
International Search Report (Application No. PCT/IB2020/059619) Dated Dec. 15, 2020.
Written Opinion (Application No. PCT/IB2020/059619) Dated Dec. 15, 2020.

* cited by examiner

SANKABUTSUHANDOUTAISOU HA ZETSUENTAISOU NO JOUHOU NI ARU

A semiconductor device comprising:
an oxide semiconductor layer over an insulator layer.

FIG. 5B

A semiconductor device comprising
an oxide semiconductor layer over an insulator layer.

DOCUMENT RETRIEVAL SYSTEM

TECHNICAL FIELD

One embodiment of the present invention relates to a document retrieval system. Another embodiment of the present invention relates to a method for retrieving documents.

BACKGROUND ART

A variety of retrieval technologies for retrieving documents have been provided. In conventional document retrieval, word (character string) retrieval is mainly used. For example, PageRank is utilized for web pages, and thesaurus is utilized in the field of patents. Furthermore, there are methods for expressing similarities of documents by making sets of words and using the Jaccard coefficient, the Sorensen-Dice coefficient, the Szymkiewicz-Simpson coefficient, or the like. In addition, there is a method in which documents are vectorized and cosine similarities are compared with the use of tf-idf, Bag of Words (BoW), Doc2Vec, or the like. In addition, there is a method in which a desired document is retrieved by using the Hamming distance, the Levenshtein distance, the Jaro-Winkler distance, or the like to evaluate similarities of strings of characters in text. Patent Document 1 discloses a language processing apparatus that compares similarities between sentences by converting structural units of the sentences into string structures and calculating the distance between the string structures.

REFERENCE

Patent Document

[Patent Document 1] Japanese Published Patent Application No. 2005-258624

SUMMARY OF THE INVENTION

Problems to be Solved by the Invention

For documents of a variety of fields to be searched through, a document retrieval method with higher precision is desired. In documents such as patent documents (e.g., specification and scope of claims) and contracts, for example, similar words are heavily used. Thus, it is important for a retrieval technology to take not only words used in the document but also the concept of the document into account.

An object of one embodiment of the present invention is to provide a document retrieval system that takes the concept of the document into account. Another object of one embodiment of the present invention is to provide a method for retrieving documents with the concept of the document taken into account.

Note that the description of these objects does not preclude the existence of other objects. One embodiment of the present invention does not have to achieve all these objects. Note that other objects will be apparent from the descriptions of the specification, the drawings, the claims, and the like, and other objects can be derived from the descriptions of the specification, the drawings, the claims, and the like.

Means for Solving the Problems

One embodiment of the resent invention is a document retrieval system including an input unit, a first processing unit, a storage unit, a second processing unit, and an output unit. The input unit has a function of inputting a first document, the first processing unit has a function of creating a first graph structure from the first document, the storage unit has a function of storing a second graph structure, the second processing unit has a function of calculating a similarity between the first graph structure and the second graph structure, the output unit has a function of supplying information, the first processing unit has a function of dividing the first document into a plurality of tokens, a node and an edge of the first graph structure include a label, and the label includes the plurality of tokens.

In the above document retrieval system, the first processing unit preferably has a function of giving a part of speech to a token.

In the above document retrieval system, the first processing unit preferably has a function of performing a modification analysis, and the first processing unit preferably has a function of combining some of the tokens in accordance with a result of the modification analysis.

In the above document retrieval system, the first processing unit preferably has a function of replacing a token having a representative word or a superordinate by the representative word or the superordinate.

In the above document retrieval system, it is preferable that the second graph structure be created in the first processing unit, from the second document.

In the above document retrieval system, in a case where the label of the edge included in the graph structure has an antonym, it is preferable that the first processing unit have a function of generating a new graph structure by reversing a direction of the edge of the graph structure and replacing the label of the edge by the antonym.

In the above document retrieval system, the second processing unit preferably has a function of vectorizing the first graph structure and the second graph structure and evaluating a similarity in vector between the vectorized first graph structure and the vectorized second graph structure.

In the above document retrieval system, the second processing unit preferably has a function of vectorizing the first graph structure and the second graph structure using Weisfeiler-Lehman Kernels.

In the above document retrieval system, in a case where a part of speech given to a first token is a noun and a part of speech given to a second token that is placed right before the first token is an adjective, the first processing unit preferably has a function of combining the second token to the first token.

In the above document retrieval system, in a case where a part of speech given to a third token and a part of speech given to a fourth token that is placed right after the third token are each a noun, the first processing unit preferably has a function of combining the third token to the fourth token.

Effect of the Invention

According to one embodiment of the present invention, a document retrieval system that takes concepts of documents into account can be provided. According to another embodiment of the present invention, a method for retrieving documents that takes concept of documents into account can be provided.

Acquiring conceptual graph structures through analyzing sentences of documents and calculating similarities of the graph structures enable conceptually close documents to be retrieved. In addition, if combined with a conventional retrieval method, the precision of ranking or the like can be improved.

Note that the effects of embodiments of the present invention are not limited to the effects listed above. The effects listed above do not preclude the existence of other effects. Note that the other effects are effects that are not described in this section and will be described below. The effects that are not described in this section can be derived from the descriptions of the specification, the drawings, and the like and can be extracted from these descriptions by those skilled in the art. Note that one embodiment of the present invention has at least one of the effects listed above and/or the other effects. Accordingly, depending on the case, one embodiment of the present invention does not have the effects listed above in some cases.

MODE FOR CARRYING OUT THE INVENTION

Embodiments will be described in detail with reference to the drawings. Note that the present invention is not limited to the following description, and it will be readily understood by those skilled in the art that modes and details of the present invention can be modified in various ways without departing from the spirit and scope of the present invention. Thus, the present invention should not be construed as being limited to the description of embodiments below.

Note that in structures of the present invention described below, the same reference numerals are used in common for the same portions or portions having similar functions in different drawings, and a repeated description thereof is omitted. Furthermore, the same hatch pattern is used for the portions having similar functions, and the portions are not especially denoted by reference numerals in some cases.

In addition, the position, size, range, or the like of each structure shown in drawings does not represent the actual position, size, range, or the like in some cases for easy understanding. Therefore, the disclosed invention is not necessarily limited to the position, size, range, or the like disclosed in the drawings.

Furthermore, ordinal numbers such as "first," "second," and "third" used in this specification are used in order to avoid confusion among components, and the terms do not limit the components numerically.

Embodiment 1

In this embodiment, a document retrieval system and a method for retrieving documents of one embodiment of the present invention will be described with reference to FIG. 1 to FIG. 4C.

Document Retrieval System

Figure 1:
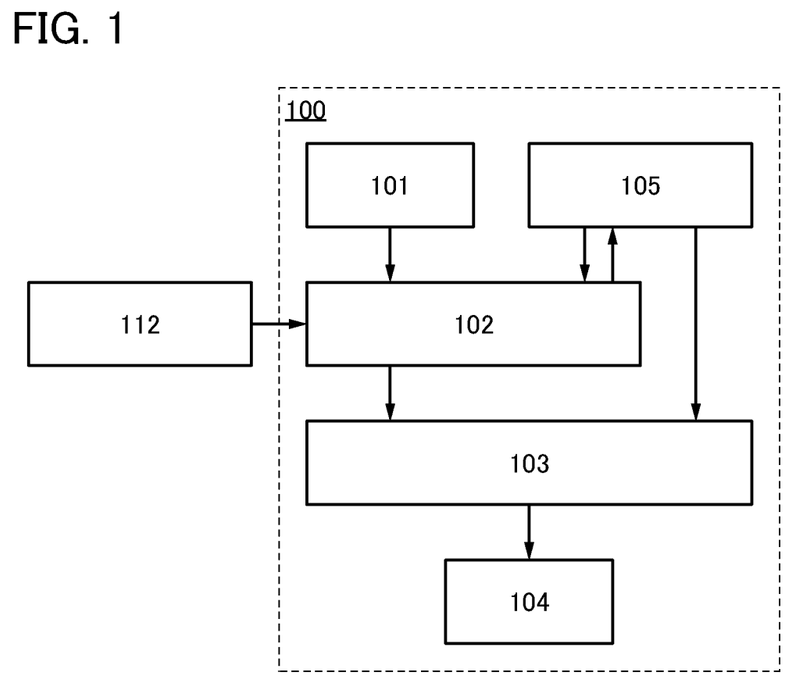
FIG. 1 is a diagram showing an example of a document retrieval system.

FIG. 1 is a diagram showing a structure of a document retrieval system 100. That is, it can be said that FIG. 1 is an example of a structure of a document retrieval system of one embodiment of the present invention.

The document retrieval system 100 may be provided in a data processing device such as a personal computer used by a user. Alternatively, a processing unit of the document retrieval system 100 may be provided in a server to be accessed by a client PC via a network and used.

As shown in FIG. 1, the document retrieval system 100 includes an input unit 101, a graph structure creation unit 102, a similarity calculation unit 103, an output unit 104, and a storage unit 105. Note that the above-mentioned processing unit includes the graph structure creation unit 102 and the similarity calculation unit 103.

The input unit 101 inputs a document 20. The document 20 is a document specified for retrieval by a user. The document 20 is text data, audio data, or image data. Examples of the input unit 101 include input devices such as a keyboard, a mouse, a touch sensor, a microphone, a scanner, and a camera.

The document retrieval system 100 may have a function of converting audio data into text data. The graph structure creation unit 102 may have the function, for example. Alternatively, the document retrieval system 100 may further include an audio-text conversion unit having the function.

The document retrieval system 100 may have an optical character recognition (OCR) function. This enables characters contained in image data to be recognized and text data to be created. The graph structure creation unit 102 may have the function, for example. Alternatively, the document retrieval system 100 may further include a character recognition unit having the function.

The storage unit 105 stores a document 10_1 to a document 10_$n$ (n is an integer of 2 or more). The document 10_1 to the document 10_$n$ are documents to be compared with the document 20. The document 10_1 to the document 10_$n$ may be hereinafter collectively referred to as a plurality of documents 10. The plurality of documents 10 are stored in the storage unit 105 through the input unit 101, a storage medium, communication, or the like.

The plurality of documents 10 stored in the storage unit 105 are preferably text data. Conversion of audio data or image data into text data, for example, can reduce the data size, which can reduce a load on the storage unit 105.

The storage unit 105 also stores a graph structure 11_1 to a graph structure 11_$n$. The graph structure 11_1 to the graph structure 11_$n$ are graph structures corresponding to the document 10_1 to the document 10_$n$, respectively. Note that the graph structure 11_1 to the graph structure 11_$n$ are created from the document 10_1 to the document 10_$n$, respectively, in the graph structure creation unit 102. The graph structure 11_1 to the graph structure 11_$n$ may be hereinafter collectively referred to as a plurality of graph structures 11.

It is preferable that the same ID be assigned to the document 10_$i$ (i is an integer greater than or equal to 1 and less than or equal to n) and the graph structure 11_i. This enables the document 10_i and the graph structure 11_i to be associated with each other. Creating the graph structure 11_1 to the graph structure 11_n in advance can shorten the time required for retrieving documents.

Note that the storage unit 105 may store the document 20. The storage unit 105 may also store a graph structure 21 corresponding to the document 20. Note that the graph structure 21 is created from the document 20 in the graph structure creation unit 102.

The graph structure creation unit 102 has a function of creating a graph structure from a document. Thus, the graph structure creation unit 102 preferably has a function of performing a morphological analysis, a function of performing a modification analysis, an abstraction function, and a function of creating a graph structure. The graph structure creation unit 102 also has a function of referring to a concept dictionary 112. With reference to the concept dictionary 112, graph structures corresponding to documents are created in the graph structure creation unit 102. The documents are the document 20 and the plurality of documents 10.

The graph structure is preferably a directed graph. A directed graph refers to a graph composed of nodes and edges with directions. Furthermore, the graph structure is preferably a directed graph with labeled nodes and edges. The use of the graph structure that is a directed graph with labels can improve the precision in similarity and retrieval.

Although FIG. 1 shows a structure where the concept dictionary 112 is provided in a device different from the document retrieval system 100, one embodiment of the present invention is not limited to this. The concept dictionary 112 may be provided in the document retrieval system 100.

In addition, the function of performing a morphological analysis and the function of performing a modification analysis may be provided in a device different from the document retrieval system 100. In that case, the document retrieval system 100 preferably transmits the document to the device, receives data resulting from the morphological analysis and modification analysis performed in the device, and then transmits the received data to the graph structure creation unit 102.

The similarity calculation unit 103 has a function of calculating similarities between a first graph structure and a second graph structure. The first graph structure corresponds to the graph structure 21. The second graph structure corresponds to one or more of the plurality of graph structures 11. In other words, similarities between a first document and a second document are evaluated in the similarity calculation unit 103. The first document corresponds to the document 20. The second document corresponds to one or more of the plurality of documents 10.

The output unit 104 has a function of supplying information. The information refers to information related to the similarity result calculated in the similarity calculation unit 103. The information is, for example, the document with the highest similarity to the document 20, among the plurality of documents 10. Alternatively, the information is the result where pairs, each composed of the document 10_i and the similarity between the document 20 and the document 10_i, are arranged in descending order of similarity. In that case, the number of pairs is 2 to n inclusive.

The information is supplied as, for example, visual information such as a character string, a numerical value, or a graph, audio information, or the like. Examples of the output unit 104 include output devices such as a display and a speaker.

The document retrieval system 100 may have a function of converting text data into audio data. The document retrieval system 100 may further include a text-audio conversion unit having the function, for example.

The above is the description of the structure of the document retrieval system 100. With the use of the document retrieval system of one embodiment of the present invention, a document that is conceptually similar to the document 20 can be retrieved from the plurality of documents 10. Furthermore, a list of documents that are conceptually similar to the document 20 can be retrieved from the plurality of documents 10.

One embodiment of the present invention can provide a document retrieval system that takes concepts of documents into account.

<Method for Retrieving Documents>

Figure 2:
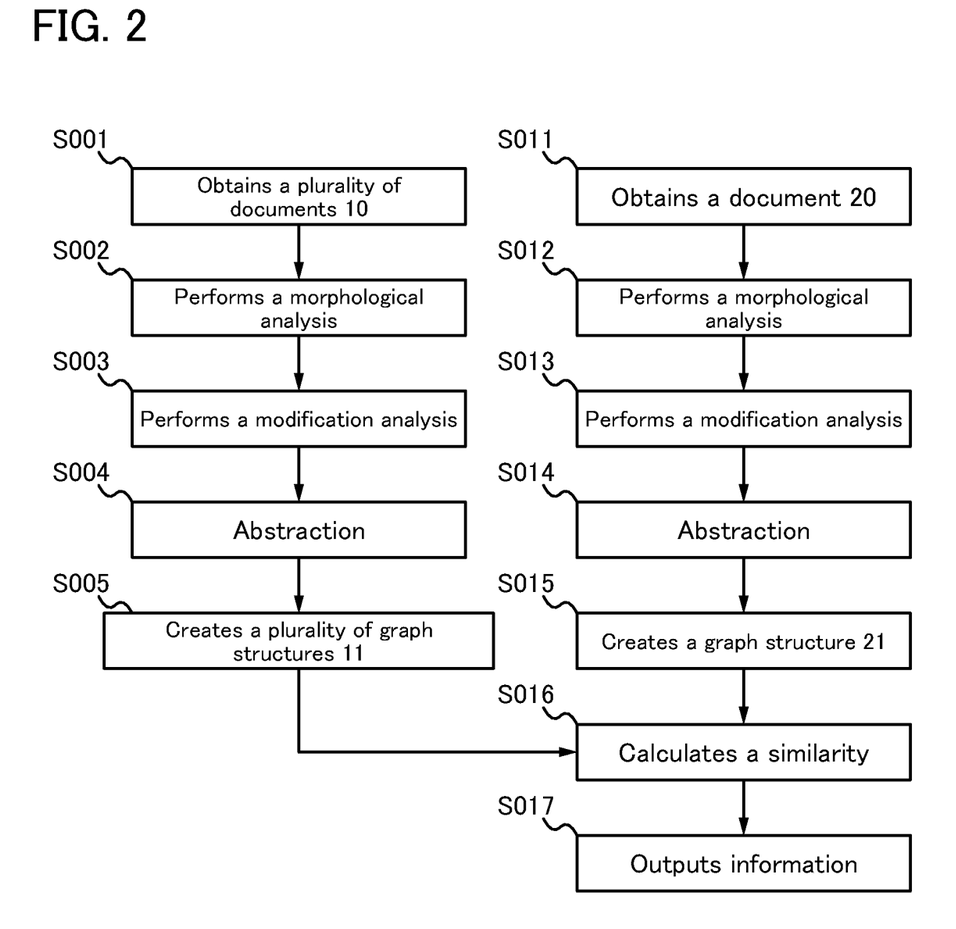
FIG. 2 is a flowchart showing an example of a method for retrieving documents.

FIG. 2 is a flowchart showing the flow of processing executed by the document retrieval system 100. That is, it can be said that FIG. 2 is a flowchart showing an example of a method for retrieving documents, which is one embodiment of the present invention.

In the method for retrieving documents of one embodiment of the present invention, a document is analyzed and turned into a graph structure, and then the similarity of the graph structure is compared using Weisfeiler-Lehman (WL) Kernels or the like to perform document retrieval.

Step S001 is a step of obtaining a plurality of documents 10. The plurality of documents 10 are stored in the storage unit 105. The plurality of documents 10 are stored in the storage unit 105 through the input unit 101, a storage medium, communication, or the like.

In the case where the plurality of documents 10 are scope of claims (claims), each of the plurality of documents 10 may be subjected to document cleaning before moving to Step S002. Document cleaning includes, for example, deletion of semicolons, conversion of colons into commas, and the like. Document cleaning can improve the precision of a morphological analysis.

Note that the document cleaning is performed as necessary even in the case where the plurality of documents 10 are something other than scope of claims (claims). Furthermore, the plurality of documents 10 may be stored in the storage unit 105 after the document cleaning being performed.

Step S002 is a step of performing a morphological analysis for each of the plurality of documents 10 in the graph structure creation unit 102. As a result, each of the plurality of documents 10 is divided into morphemes. In this specification, divided morphemes may be referred to as tokens.

It is preferable in Step S002 that the part of speech of each of the divided morphemes (tokens) be determined and each of the divided morphemes (tokens) be associated with a part of speech label. When morphemes (tokens) are associated with part of speech labels, the precision of a modification analysis can be improved. Note that in this specification and the like, associating a morpheme (token) to a part of speech label can be rephrased as giving a part of speech to a morpheme (token).

In the case where the graph structure creation unit 102 does not have a function of performing a morphological analysis, a morphological analysis program (also referred to as a morphological analyzer) incorporated in a device different from the document retrieval system may be used to perform a morphological analysis for each of the plurality of documents 10. In that case, Step S002 is a step of transmitting the plurality of documents 10 to the device, performing a morphological analysis in the device, and receiving data on the morphological analysis result.

Step S003 is a step of performing a modification analysis in the graph structure creation unit 102. In other words, Step S003 is a step of combining some of a plurality of tokens in accordance with the modification of the divided morphemes (tokens). In the case where tokens satisfy a certain condition, for example, the tokens satisfying the condition are combined to form a new token.

In the case where the Japanese language is used in a document, specifically, in the case where a j-th token (j is an integer of 2 or more) is a noun and a token right before the j-th token (referred to as a (j−1)-th token) is an adjective, the (j−1)-th token and the j-th token are combined to form a new token. In the case where the j-th token is a noun and a token right after the j-th token (referred to as a (j+1)-th token) is a noun, the j-th token and the (j+1)-th token are combined to form a new token.

Note that the above-described conditions are set as appropriate in accordance with the language used in the document.

The modification analysis preferably includes a compound word analysis. This modification analysis enables some of the plurality of tokens to be combined and a compound word to be created as a new token. Thus, even when the document includes a compound word that is not registered in the concept dictionary 112, the division of the document into tokens can be performed with high precision.

In the case where the graph structure creation unit 102 does not have a function of performing a modification analysis, a modification analysis program (also referred to as a modification analyzer) incorporated in a device different from the document retrieval system may be used to perform a modification analysis. In that case, Step S003 is the step of transmitting divided morphemes (tokens) to the device, performing a modification analysis in the device, and receiving data on the modification analysis result.

Step S004 is a step of abstracting a token in the graph structure creation unit 102. For example, a word contained in the token is analyzed to acquire a representative word. When the representative word has a superordinate, the superordinate is acquired. Then, the token is replaced by the acquired representative word or the superordinate. Here, a representative word is a headword (also referred to as a lemma) of a group of synonyms. A superordinate is a representative word that corresponds to a broader concept of a representative word. That is, abstraction of a token refers to replacement of the token by a representative word or a superordinate. Note that in the case where the token is a representative word or a superordinate, that token does not have to be replaced.

The upper limit of a hierarchy of the superordinate by which a token is replaced is preferably 1 to 2 inclusive, and more preferably 1. Note that the upper limit of a hierarchy of the superordinate by which a token is replaced may be specified. This can prevent a token to be replaced by a superordinate to an excessive degree.

The appropriate degree of conceptualization of a token depends on the field. Thus, conceptualization of a token is preferably performed through machine learning in accordance with the field. Conceptualization of a token is performed by vectorizing the token with morphemes contained in the token to be classified by a classifier, for example. Note that an algorithm such as a decision tree, support-vector machines, random forests, or a multilayer perceptron may be used as the classifier. Specifically, "oxide semiconductor", "amorphous semiconductor", "silicon semiconductor", and "GaAs semiconductor" are classified into "semiconductor". Furthermore, "oxide semiconductor layer", "oxide semiconductor film", "amorphous semiconductor layer", "amorphous semiconductor film", "silicon semiconductor layer", "silicon semiconductor film", "GaAs semiconductor layer", and "GaAs semiconductor film" are also classified into "semiconductor".

In addition, the classifier may be used to classify morphemes contained in the token, depending on whether or not the morpheme should be extracted. In the case where a token "SANKABUTSUHANDOUTAISOU" is abstracted, for example, the token is resolved into morphemes again, and resolved morphemes "SANKA" "BUTSU" "HANDOUTAI" and "SOU" are input to the classifier. After input to the classifier, when the classifier classifies the token into "HANDOUTAI", the token is replaced by "HANDOUTAI". In this way, the token can be abstracted.

Other than the above machine learning algorithms, conditional random field (CRF) may be used. Alternatively, CRF and the above methods may be combined.

Abstracting a token enables a document to be grasped conceptually. This enables document retrieval based on conceptual factors of the document, less affected by the structure and expressions of the document.

For acquisition of a representative word and a superordinate, a concept dictionary may be used or classification by machine learning may be carried out. As the concept dictionary, the concept dictionary 112 provided in a device different from the document retrieval system 100 may be used, or a concept dictionary provided in the document retrieval system 100 may be used.

Step S005 is a step of creating the plurality of graph structures 11 in the graph structure creation unit 102. In other words, Step S005 is a step of creating graph structures with the tokens, which have been prepared by the end of Step S004, used as nodes or edges. Specifically, in the case where a document includes a first token and a second token that make up a noun phrase and a third token that expresses the relation between the first token and the second token, a graph structure where each of the first token and the second token is a node and a label of the node and the third token is an edge and a label of the edge is created. In other words, the label of the node and the label of the edge are formed from tokens that have been prepared by the end of Step S004.

In the case where the document is scope of claims (claims), nodes of the graph structure are constituents, and edges of the graph structure are relations between the constituents. In the case where the document is a contract document or the like, nodes of the graph structure are parties A and B, and edges of the graph structure are detailed conditions.

The graph structure may be created from the modification relation between tokens, on the basis of a rule. Furthermore, machine learning for labeling the nodes and edges based on a list of tokens may be performed with the use of CRF. Thus, the nodes and edges can be labeled based on the list of tokens. Furthermore, learning with Seq2Seq model, in which a list of tokens is input and nodes and directions of edges are output, may be performed using a recurrent neural network (RNN), long short-term memory (LSTM), or the like. Thus, the nodes and directions of edges can be output from the list of tokens.

The graph structure creation unit 102 may have a function of reversing the direction of the edge and replacing the label of the edge by an antonym of the label of the edge. In the case where the graph structure has a first edge and a second edge given with a label that is an antonym of the label of the first edge, for example, a new graph structure may be created by reversing the direction of the second edge and replacing the label of the second edge by an antonym of the label of the second edge (i.e., the label of the first edge). Thus, the structure having conceptual sameness can be covered. This enables document retrieval based on conceptual factors of the document to be performed with less effects of the document structure or expressions.

Note that the above processing is performed on an edge that appears less frequently than the other edge in the document. Specifically, in the case where the second edge appears less frequently than or as frequently as the first edge, the direction of the second edge is reversed and the label of the second edge is replaced by an antonym of the label of the second edge (i.e., the label of the first edge). This can reduce the frequency of creating a new graph.

The sequence of Step S004 and Step S005 may be switched. In the case where the sequence of Step S004 and Step S005 is changed, nodes and edges in the graph structure are abstracted after the graph structure is created. Thus, even when the sequence of Step S004 and Step S005 is switched, an abstracted graph structure can be created from the document.

Through Step S001 to Step S005, the plurality of graph structures 11 can be created from the plurality of documents 10. Note that Step S001 to Step S005 are preferably performed before a similarity is calculated. Creating the plurality of graph structures 11 in advance can shorten the time required for retrieving documents.

Step S011 is a step of obtaining the document 20. The document 20 is a document input by the input unit 101. Note that in the case where the document 20 is data other than text data, i.e., audio data or image data, the document 20 is converted into text data before moving to Step S012. Conversion into text data is preferably carried out using a function of converting audio data into text data, which the graph structure creation unit 102 has, an optical character recognition (OCR) function, which the audio-text conversion unit or the graph structure creation unit 102 has, or a character recognition unit.

In the case where the document 20 is scope of claims (claims), the document 20 may be subjected to the above-mentioned document cleaning before moving to Step S012. The document cleaning can improve the precision of a morphological analysis. Note that the document cleaning is performed as necessary even in the case where the document 20 is something other than scope of claims (claims).

Step S012 is a step of performing a morphological analysis for the document 20 in the graph structure creation unit 102. Note that since Step S012 is a step similar to Step S002, the description of Step S002 can be referred to for the description of Step S012.

Step S013 is a step of performing a modification analysis in the graph structure creation unit 102. Note that since Step S013 is a step similar to Step S003, the description of Step S003 can be referred to for the description of Step S013.

Step S014 is a step of abstracting a token in the graph structure creation unit 102. Note that since Step S014 is a step similar to Step S004, the description of Step S004 can be referred to for the description of Step S014.

Step S015 is a step of creating the graph structure 21 in the graph structure creation unit 102. Note that since Step S015 is a step similar to Step S005, the description of Step S005 can be referred to for the description of Step S015.

Step S016 is a step of evaluating a similarity between the document 20 and each of the plurality of documents 10 in the similarity calculation unit 103. Specifically, the graph structure 21 and the plurality of graph structures 11 are vectorized using WL Kernels, and a similarity between the vectorized graph structure 21 and each of the plurality of vectorized graph structures 11 is evaluated.

Step S017 is a step of outputting information by the output unit 104. The information relates to the similarity results calculated in the similarity calculation unit 103.

The above is the description of the method for retrieving documents. With the use of the method for retrieving documents of one embodiment of the present invention, a document that is conceptually close to the document specified for the retrieval can be retrieved. In addition, documents that are conceptually close to the document specified for the retrieval can be retrieved with the order of closeness. Furthermore, document retrieval based on conceptual factors of the documents can be performed with less effects of the document structures or expressions.

One embodiment of the present invention can provide a method for retrieving documents that takes concepts of documents into account.

<<Actual Example of Creating Graph Structure From Document>>

An actual example of creating a graph structure from a document, in the above-described method for retrieving documents, will be described with reference to FIG. 3A to FIG. 6C.

Figure 3A:
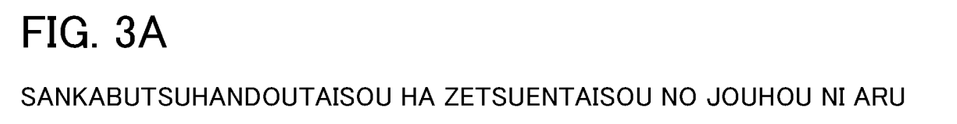
FIG. 3A to FIG. 3C are diagrams showing results obtained in each step.
Figure 3B:
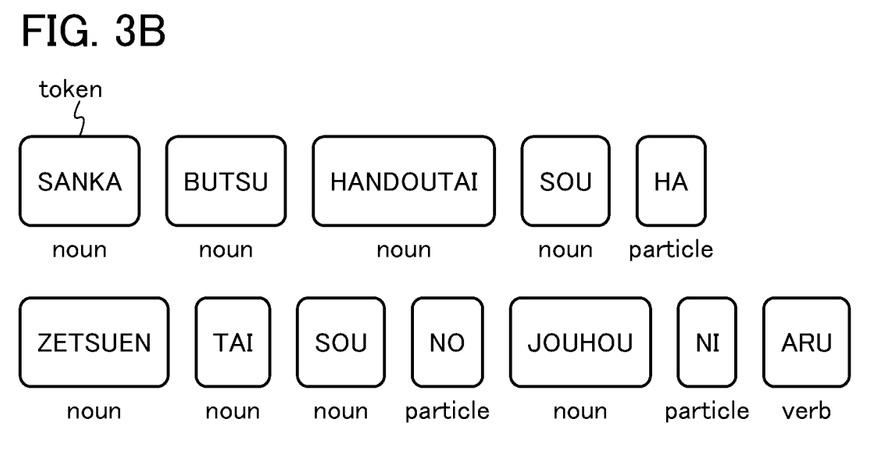
Figure 3C:
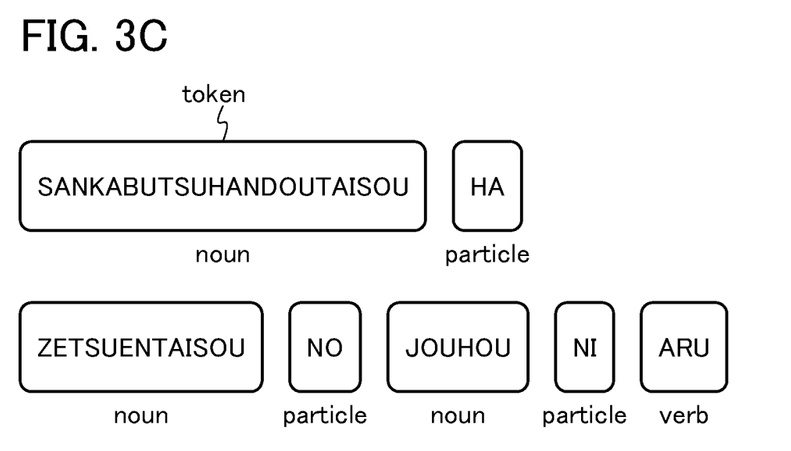
Figure 4A:
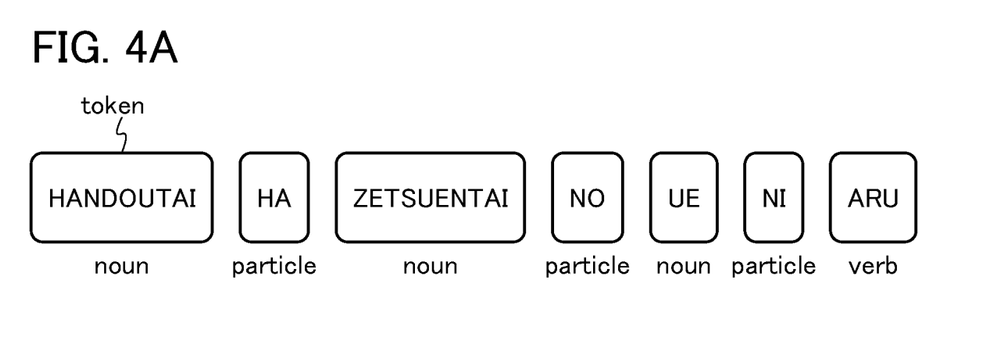
FIG. 4A to FIG. 4C are diagrams showing results obtained in each step.

First, a document using Japanese "SANKABUTSU-HANDOUTAISOU HA ZETSUENTAISOU NO JOUHOU NI ARU" (see FIG. 3A) is taken as an example for illustration. Note that rounded rectangles in FIG. 3B, FIG. 3C, and FIG. 4A are tokens, and parts of speech given to the tokens are described below the rounded rectangles.

First, by performing a morphological analysis of the document, the document is divided into tokens, and a part of speech is given to each of the tokens (Step S002 and Step S012 in FIG. 2). As a result, the result like the one shown in FIG. 3B can be obtained. Specifically, the document is divided into tokens and a part of speech is given to each of the tokens, as follows: "SANKA" (noun)|"BUTSU" (noun)|"HANDOTAI" (noun)|"SOU" (noun)|"HA" (particle)|"ZETSUEN" (noun)|"TAI" (noun)|"SOU" (noun)|"NO" (particle)|"JOUHOU" (noun)|"NI" (particle)|"ARU" (verb).

Next, a modification analysis is performed (Step S003 and Step S013 in FIG. 2). As a result, the result like the one shown in FIG. 3C can be obtained. Specifically, "SANKA" and "BUTSU", "BUTSU" and "HANDOUTAI", and HANDOUTAI" and "SOU" satisfy the condition described in Step S003. Thus, the four tokens "SANKA", "BUTSU", "HANDOUTAI", and "SOU" are combined, which can be replaced by one token "SANKABUTSUHANDOUTAISOU". In addition, "ZETSUEN" and "TAI", and "TAI" and "SOU" satisfy the condition described in Step S003. Thus, the three tokens "ZETSUEN", "TAI", and "SOU" are combined, which can be replaced by one token "ZETSUENTAISOU". In this manner, the above document becomes: "SANKABUTSUHANDOUTAISOU" (noun)|"HA" (particle)|"ZETSUENTAISOU" (noun)|"NO" (particle)|"JOUHOU" (noun)|"NI" (particle)|"ARU" (verb).

Next, the tokens are abstracted (Step S004 and Step S014 in FIG. 2). As a result, the result like the one shown in FIG. 4A can be obtained. Specifically, "SANKABUTSUHANDOUTAISOU" is replaced by a superordinate "HANDOUTAI". In addition, "ZETSUENTAISOU" is replaced by a superordinate "ZETSUENTAI". In addition, "JOUHOU" is replaced by a representative word "UE". As a result, the above document is abstracted to become: "HANDOUTAI" (noun)|"HA" (particle)|"ZETSUENTAI" (noun)|"NO" (particle)|"UE" (noun)|"NI" (particle)|"ARU" (verb).

Next, a graph structure is created (Step S005 and Step S015 in FIG. 2). As a result, the result like the one shown in FIG. 4B can be obtained. Specifically, "HANDOUTAI" and "ZETSUENTAI" become nodes of the graph structure and labels of the nodes, and "UE" becomes an edge of the graph structure and a label of the edge.

Figure 4B:
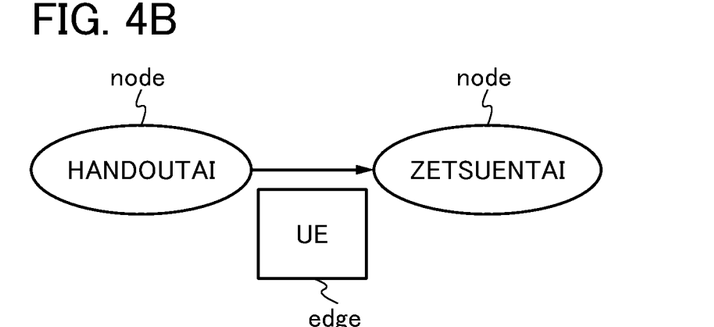

Here, an antonym of "UE" is "SHITA". Thus, the arrow shown in FIG. 4B is reversed, and the edge and the label of the edge "UE" in the graph structure shown in FIG. 4B is replaced by "SHITA", whereby the graph structure shown in FIG. 4C may be newly created. In this manner, the structure having conceptual sameness can be covered.

Figure 4C:
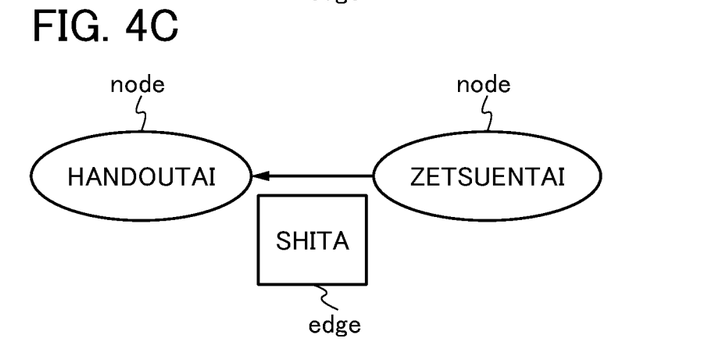

The arrows in FIG. 4B and FIG. 4C are illustrated to go from the node that appears earlier in the document (for the above document, "HANDOUTAI") toward the node that appears later (for the above document, "ZETSUENTAI"). In other words, the starting point of the arrow is the node that appears earlier, and the ending point of the arrow is the node that appears later. Note that this embodiment is not limited thereto. For example, the direction of an arrow may be determined based on the semantic relation between words, such as the positional relation. Specifically, a graph structure in which the starting point of an arrow is the node labeled as "ZETSUENTAI" and the ending point of the arrow is the node labeled as "HANDOUTAI" and an edge between these nodes and the label of the edge are "UE" may be created. This enables the graph structure to be understood intuitively. However, a method for determining the direction of an arrow needs to be standardized in the method for retrieving documents.

Through the above, an abstracted graph structure can be created from the above document.

Figure 5A:
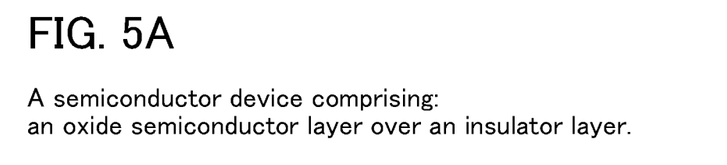
FIG. 5A to FIG. 5D are diagrams showing results obtained in each step.
Figure 5B:
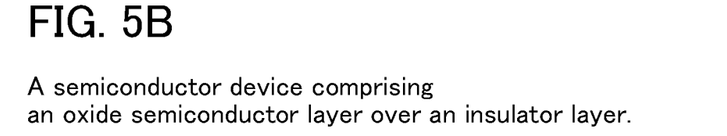
Figure 5C:
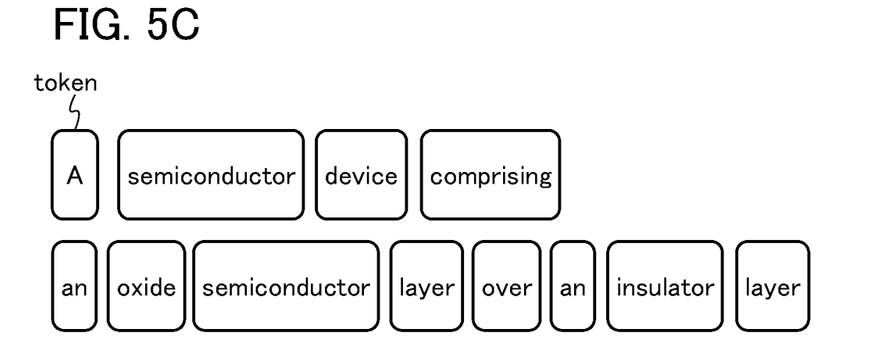
Figure 5D:
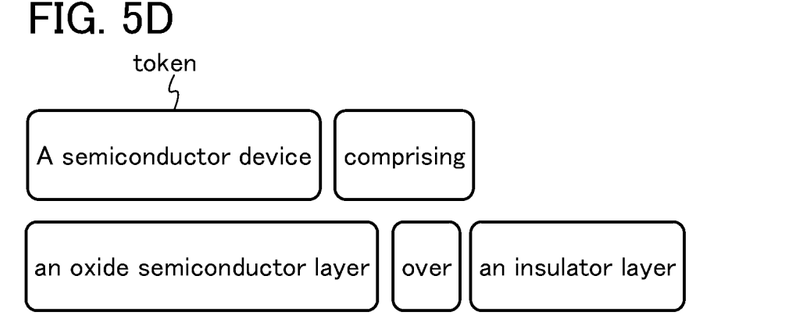
Figure 6A:
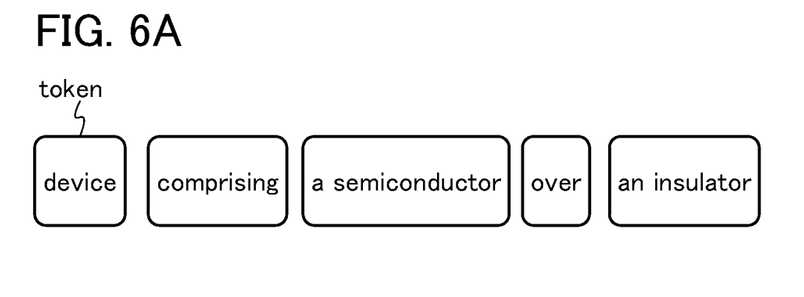
FIG. 6A to FIG. 6C are diagrams showing results obtained in each step.

Next, a document using English "A semiconductor device comprising: an oxide semiconductor layer over an insulator layer." (see FIG. 5A) is taken as an example for illustration. Note that rounded rectangles in FIG. 5C, FIG. 5D, and FIG. 6A are tokens. Although an example in which parts of speech are not given to the tokens is illustrated here, parts of speech may be given to the tokens.

First, the above document is subjected to document cleaning. Here, a semicolon is deleted. As a result, the result like the one shown in FIG. 5B can be obtained.

Next, by performing a morphological analysis of the document, the document is divided into tokens (Step S002 and Step S012 in FIG. 2). As a result, the result like the one shown in FIG. 5C can be obtained. Specifically, the document becomes: "A"|"semiconductor"|"device"|"comprising"51 "an"|"oxide"|"semiconductor"|"layer"|"over"|"an-"|"insulator"|"layer".

Next, a modification analysis is performed (Step S003 and Step S013 in FIG. 2). As a result, the result like the one shown in FIG. 5D can be obtained. Specifically, three tokens ("A", "semiconductor", and "device") are combined, which can be replaced by one token ("A semiconductor device"). In addition, four tokens ("an", "oxide", "semiconductor", and "layer") are combined, which can be replaced by one token ("an oxide semiconductor layer"). In addition, three tokens ("an", "insulator", and "layer") are combined, which can be replaced by one token ("an insulator layer"). In this manner, the above document becomes: "A semiconductor device"|"comprising"|"an oxide semiconductor layer"|"over"|"an insulator layer".

Next, the tokens are abstracted (Step S004 and Step S014 in FIG. 2). As a result, the result like the one shown in FIG. 6A can be obtained. Specifically, "A semiconductor device" is replaced by a superordinate "device". In addition, "an oxide semiconductor layer" is replaced by a superordinate "a semiconductor". In addition, "an insulator layer" is replaced by a superordinate "an insulator". As a result, the above document is abstracted to become: "device"|"comprising"|"a semiconductor"|"over"|"an insulator".

Next, a graph structure is created (Step S005 and Step S015 in FIG. 2). As a result, the result like the one shown in FIG. 6B can be obtained. Specifically, "device", "semiconductor", and "insulator" each become a node of the graph structure and a label of the node, and "comprising" and "over" each become an edge of the graph structure and a label of the edge.

Figure 6B:
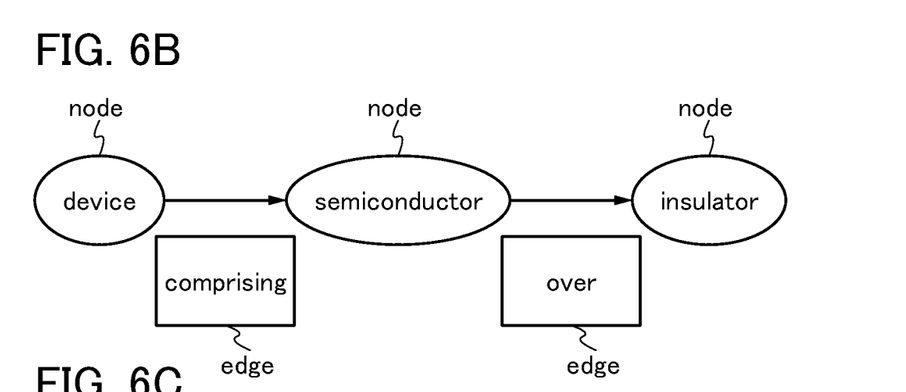

Here, an antonym of "over" is "under". Thus, an arrow shown in FIG. 6B is reversed, and the edge and the label of the edge "over" in the graph structure shown in FIG. 6B is replaced by "under", whereby the graph structure shown in FIG. 6C may be newly created. In this manner, the structure having conceptual sameness can be covered.

Figure 6C:
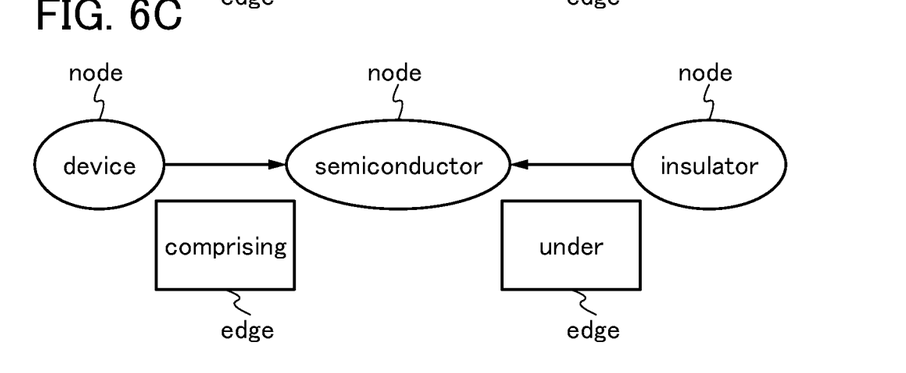

The arrows in FIG. 6B and FIG. 6C are illustrated to go from the node that appears earlier in the document (for the above document, "semiconductor") toward the node that appears later (for the above document, "insulator"). In other words, the starting point of the arrow is the node that appears earlier, and the ending point of the arrow is the node that appears later. Note that this embodiment is not limited thereto. For example, the direction of an arrow may be determined based on the semantic relation between words, such as the positional relation. Specifically, a graph structure in which the starting point of an arrow is the node labeled as "insulator" and the ending point of the arrow is the node labeled as "semiconductor" and an edge between these nodes and the label of the edge are "over" may be created. This enables the graph structure to be understood intuitively. However, a method for determining the direction of an arrow needs to be standardized in the method for retrieving documents.

Through the above, an abstracted graph structure can be created from the above document.

Although the steps up to the creation of a graph structure from a document have been described taking an example of a document where Japanese is used and an example of a document where English is used, the languages of documents are not limited to Japanese and English. From documents where languages such as Chinese, Korean, German, French, Russian, and Hindi are used, a graph structure can be created by taking steps similar to the above.

This embodiment can be combined with the other embodiment as appropriate. In this specification, in the case where a plurality of structure examples are shown in one embodiment, the structure examples can be combined as appropriate.

Embodiment 2

In this embodiment, the document retrieval system of one embodiment of the present invention will be described with reference to FIG. 7 and FIG. 8.

The document retrieval system of this embodiment can perform document retrieval easily with the use of the method for retrieving documents described in Embodiment 1.

<Structure Example 1 of Document Retrieval System>

Figure 7:
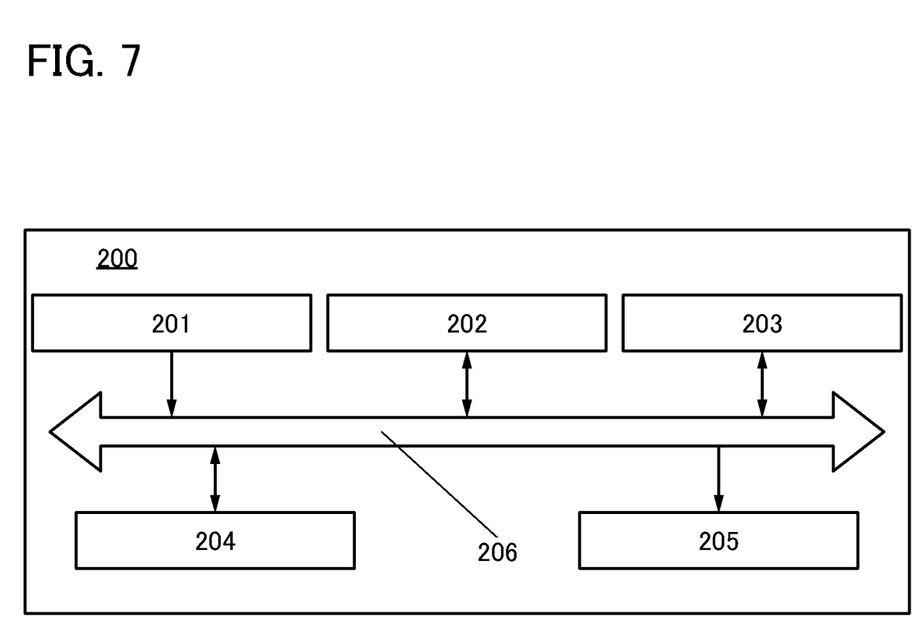
FIG. 7 is a diagram showing an example of hardware of a document retrieval system.

FIG. 7 shows a block diagram of the document retrieval system 200. Note that in the drawings attached to this specification, the block diagram in which components are classified according to their functions and shown as independent blocks is illustrated; however, it is difficult to completely separate actual components according to their functions, and it is possible for one component to relate to a plurality of functions. Moreover, one function can relate to a plurality of components; for example, processing of a processing unit 202 can be executed on different servers depending on the processing.

The document retrieval system 200 includes at least the processing unit 202. The document retrieval system 200 in FIG. 7 further includes an input unit 201, a memory unit 203, a database 204, a display unit 205, and a transmission path 206.

[Input Unit 201]

To the input unit 201, a document is supplied from the outside of the document retrieval system 200. The document is specified by a user for retrieval, and corresponds to the document 20 described in Embodiment 1. In addition, a plurality of documents may be supplied from the outside of the document retrieval system 200 to the input unit 201. The plurality of documents are to be compared with the above document, and correspond to the plurality of documents 10 described in Embodiment 1. The plurality of documents and the document supplied to the input unit 201 are each supplied to the processing unit 202, the memory unit 203, or the database 204 through the transmission path 206.

The plurality of documents and the document are input in the form of text data, audio data, or image data, for example. The plurality of documents are preferably input as text data.

Examples of a method for inputting the document are key input with a keyboard, a touch panel, or the like, audio input with a microphone, reading from a recording medium, image input with a scanner, a camera, or the like, and obtainment via communication.

The document retrieval system 200 may have a function of converting audio data into text data. For example, the processing unit 202 may have the function. Alternatively, the document retrieval system 200 may further include an audio conversion unit having the function.

The document retrieval system 200 may have an optical character recognition (OCR) function. This enables characters contained in image data to be recognized and text data to be created. For example, the processing unit 202 may have the function. Alternatively, the document retrieval system 200 may further include a character recognition unit having the function.

[Processing Unit 202]

The processing unit 202 has a function of performing an arithmetic operation with the use of the data supplied from the input unit 201, the memory unit 203, the database 204, or the like. The processing unit 202 can supply an arithmetic operation result to the memory unit 203, the database 204, the display unit 205, or the like.

The processing unit 202 includes the graph structure creation unit 102 and the similarity calculation unit 103 described in Embodiment 1. That is, the processing unit 202 has a function of performing a morphological analysis, a function of performing a modification analysis, an abstraction function, and a function of creating a graph structure.

A transistor whose channel formation region contains a metal oxide may be used in the processing unit 202. The transistor has an extremely low off-state current; therefore, with use of the transistor as a switch for retaining electric charge (data) which flows into a capacitor functioning as a memory element, a long data retention period can be ensured. When at least one of a register and a cache memory included in the processing unit 202 has such a feature, the processing unit 202 can be operated only when needed, and otherwise can be off while data processed immediately before turning off the processing unit 202 is stored in the memory element. Accordingly, normally-off computing is possible and the power consumption of the document retrieval system 200 can be reduced.

In this specification and the like, a transistor including an oxide semiconductor in its channel formation region is referred to as an oxide semiconductor transistor (OS transistor). A channel formation region of an OS transistor preferably includes a metal oxide.

The metal oxide included in the channel formation region preferably contains indium (In). When the metal oxide included in the channel formation region is a metal oxide containing indium, the carrier mobility (electron mobility) of the OS transistor increases. The metal oxide contained in the channel formation region preferably contains an element M. The element M is preferably aluminum (Al), gallium (Ga), or tin (Sn). Other elements that can be used as the element M are boron (B), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that two or more of the above elements may be used in combination as the element M. The element M is an element having high bonding energy with oxygen, for example. The element M is an element having higher bonding energy with oxygen than indium, for example. The metal oxide contained in the channel formation region preferably contains zinc (Zn). The metal oxide containing zinc is easily crystallized in some cases.

The metal oxide included in the channel formation region is not limited to the metal oxide containing indium. The metal oxide included in the channel formation region may be a metal oxide that does not contain indium and contains zinc, a metal oxide that contains gallium, or a metal oxide that contains tin, e.g., zinc tin oxide or gallium tin oxide.

Furthermore, a transistor containing silicon in a channel formation region may be used in the processing unit 202.

In the processing unit 202, a transistor containing an oxide semiconductor in a channel formation region and a transistor containing silicon in a channel formation region may be used in combination.

The processing unit 202 includes, for example, an arithmetic circuit, a central processing unit (CPU), or the like.

The processing unit 202 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing unit 202 can interpret and execute instructions from various programs with the use of a processor to process various types of data and control programs. The programs to be executed by the processor are stored in at least one of a memory region of the processor and the memory unit 203.

The processing unit 202 may include a main memory. The main memory includes at least one of a volatile memory such as a RAM and a nonvolatile memory such as a ROM.

A DRAM (Dynamic Random Access Memory), an SRAM (Static Random Access Memory), or the like is used as the RAM, for example, and a memory space is virtually assigned as a work space for the processing unit 202 to be used. An operating system, an application program, a program module, program data, a look-up table, and the like which are stored in the memory unit 203 are loaded into the RAM and executed. The data, program, and program module which are loaded into the RAM are each directly accessed and operated by the processing unit 202.

In the ROM, a BIOS (Basic Input/Output System), firmware, and the like for which rewriting is not needed can be stored. As examples of the ROM, a mask ROM, an OTPROM (One Time Programmable Read Only Memory), an EPROM (Erasable Programmable Read Only Memory), and the like can be given. As the EPROM, a UV-EPROM (Ultra-Violet Erasable Programmable Read Only Memory) which can erase stored data by ultraviolet irradiation, an EEPROM (Electrically Erasable Programmable Read Only Memory), a flash memory, and the like can be given.

[Memory Unit 203]

The memory unit 203 has a function of storing a program to be executed by the processing unit 202. The memory unit 203 may have a function of storing an arithmetic operation result generated by the processing unit 202, and data input to the input unit 201, for example. Specifically, the memory unit 203 preferably has a function of storing the graph structure created in the processing unit 202 (e.g., the graph structure 21 described in Embodiment 1), the result of similarity calculation, and the like.

The memory unit 203 includes at least one of a volatile memory and a nonvolatile memory. For example, the memory unit 203 may include a volatile memory such as a DRAM or an SRAM. For example, the memory unit 203 may include a nonvolatile memory such as an ReRAM (Resistive Random Access Memory), a PRAM (Phase change Random Access Memory), an FeRAM (Ferroelectric Random Access Memory), an MRAM (Magnetoresistive Random Access Memory), or a flash memory. The memory unit 203 may include a storage media drive such as a hard disc drive (HDD) or a solid state drive (SSD).

[Database 204]

The document retrieval system 200 may include the database 204. The database 204 has a function of storing a plurality of documents and a plurality of graph structures corresponding to the plurality of documents, for example. The method for retrieving documents of one embodiment of the present invention may be used for the plurality of documents stored in the database 204, for example. The database 204 may also store a concept dictionary.

Note that the memory unit 203 and the database 204 do not have to be separated from each other. For example, the document retrieval system 200 may include a storage unit that has both the functions of the memory unit 203 and the database 204.

Note that memories included in the processing unit 202, the memory unit 203, and the database 204 can each be regarded as an example of a non-transitory computer readable storage medium.

[Display Unit 205]

The display unit 205 has a function of displaying an arithmetic operation result obtained in the processing unit 202. The display unit 205 also has a function of displaying a document subjected to comparison, and the similarity result. The display unit 205 may also have a function of displaying a document specified for the retrieval.

Note that the document retrieval system 200 may include an output unit. The output unit has a function of supplying data to the outside.

[Transmission Path 206]

The transmission path 206 has a function of transmitting a variety of data. The data transmission and reception among the input unit 201, the processing unit 202, the memory unit 203, the database 204, and the display unit 205 can be performed through the transmission path 206. Data including the document specified by a user for the retrieval, the graph structure of a document to be compared with the document, and the like is transmitted or received through the transmission path 206, for example.

<Structure Example 2 of Document Retrieval System>

Figure 8:
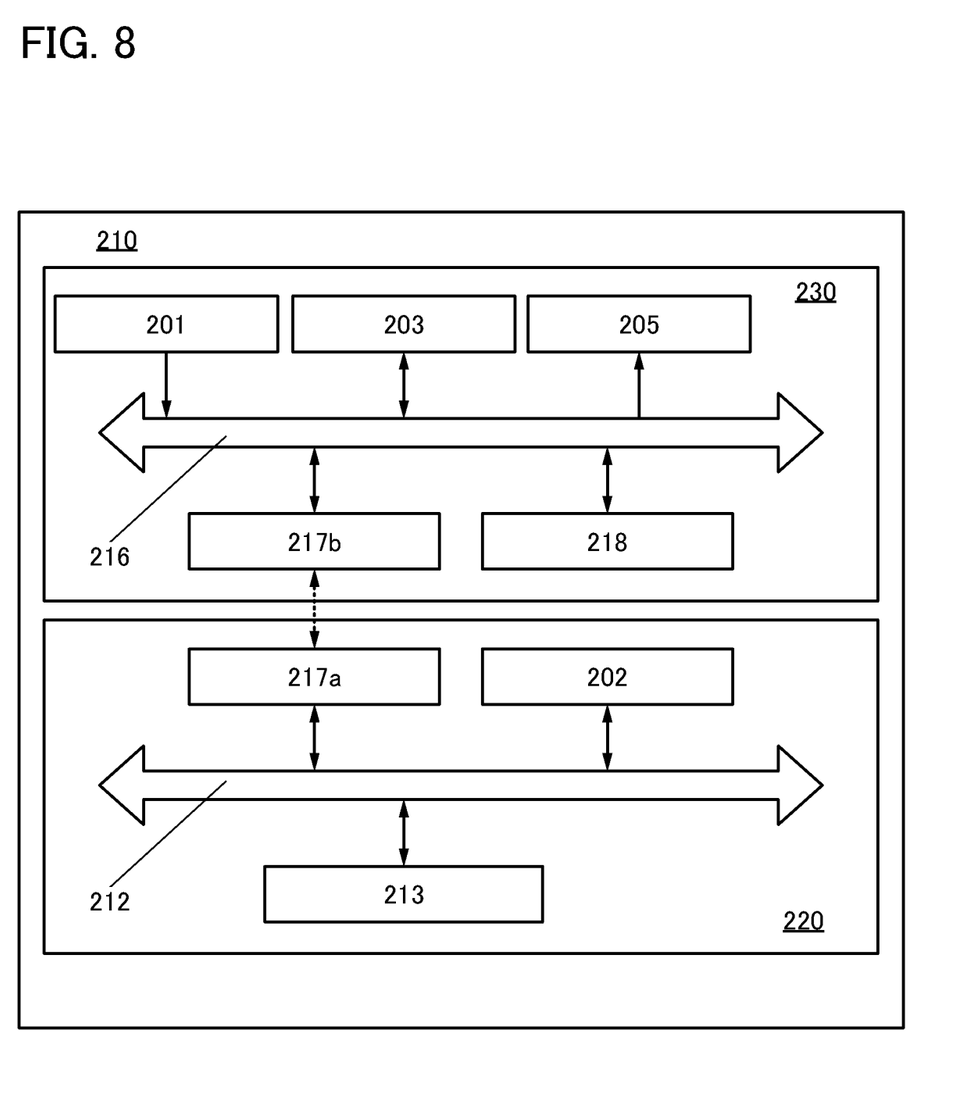
FIG. 8 is a diagram showing an example of hardware of a document retrieval system.

FIG. 8 shows a block diagram of a document retrieval system 210. The document retrieval system 210 includes a server 220 and a terminal 230 (e.g., a personal computer).

The server 220 includes a processing unit 202, a transmission path 212, a memory unit 213, and a communication unit 217a. The server 220 may further include an input/output unit or the like, although not illustrated in FIG. 8.

The terminal 230 includes an input unit 201, a memory unit 203, a display unit 205, a transmission path 216, a communication unit 217b, and a processing unit 218. The terminal 230 may further include a database or the like, although not illustrated in FIG. 8.

A user of the document retrieval system 210 inputs a document to the input unit 201 of the terminal 230. The document is specified by the user for retrieval and corresponds to the document 20 described in Embodiment 1. The document is transmitted from the communication unit 217b of the terminal 230 to the communication unit 217a of the server 220.

The document received by the communication unit 217a passes through the transmission path 212 and is stored in the memory unit 213. Alternatively, the document may be directly supplied to the processing unit 202 from the communication unit 217a.

For the creation of a graph structure and similarity calculation described in Embodiment 1, high processing capability is required. The processing unit 202 included in the server 220 has higher processing capability than the processing unit 218 included in the terminal 230. Thus, the creation of a graph structure and similarity calculation are preferably performed in the processing unit 202.

Then, similarity is calculated by the processing unit 202. The similarity is stored in the memory unit 213 through the transmission path 212. Alternatively, the similarity may be directly supplied to the communication unit 217a from the processing unit 202. The similarity is transmitted from the communication unit 217a of the server 220 to the communication unit 217b of the terminal 230. The similarity is displayed on the display unit 205 of the terminal 230.

[Transmission Path 212 and Transmission Path 216]

The transmission path 212 and the transmission path 216 have a function of transmitting data. Data transmission and reception between the processing unit 202, the memory unit 213, and the communication unit 217a can be carried out through the transmission path 212. Data transmission and reception between the input unit 201, the memory unit 203, the display unit 205, the communication unit 217b, and the processing unit 218 can be carried out through the transmission path 216.

[Processing Unit 202 and Processing Unit 218]

The processing unit 202 has a function of performing an arithmetic operation with the use of data supplied from the memory unit 213, the communication unit 217a, or the like. The processing unit 218 has a function of performing an arithmetic operation with the use of data supplied from the input unit 201, the memory unit 203, the display unit 205, the communication unit 217b, or the like. The description of the processing unit 202 can be referred to for the processing unit 202 and the processing unit 218. The processing unit 202 preferably has higher processing capacity than the processing unit 218.

[Memory Unit 203]

The memory unit 203 has a function of storing a program to be executed by the processing unit 218. The memory unit 203 has a function of storing an arithmetic operation result generated by the processing unit 218, data input to the communication unit 217b, data input to the input/output unit 201, and the like.

[Memory Unit 213]

The memory unit 213 has a function of storing a plurality of documents, a plurality of graph structures corresponding to the plurality of documents, the arithmetic operation result generated by the processing unit 202, data input to the communication unit 217a, and the like.

[Communication Unit 217a and Communication Unit 217b]

The server 220 and the terminal 230 can transmit and receive data with the use of the communication unit 217a and the communication unit 217b. As the communication unit 217a and the communication unit 217b, a hub, a router, a modem, or the like can be used. Data may be transmitted or received through wire communication or wireless communication (e.g., radio waves or infrared rays).

Note that communication between the server 220 and the terminal 230 may be performed by connecting to a computer network such as the Internet, which is an infrastructure of the World Wide Web (WWW), an intranet, an extranet, a PAN (Personal Area Network), a LAN (Local Area Network), a CAN (Campus Area Network), a MAN (Metropolitan Area Network), a WAN (Wide Area Network), or a GAN (Global Area Network).

This embodiment can be combined with the other embodiment as appropriate.

REFERENCE NUMERALS

:10: plurality of documents, 10_1: document, 10_1: document, 10_n: document, 11: plurality of graph structures, 11_1: graph structure, 11_i: graph structure, 11_n: graph structure, 20: document, 21: graph structure, 100: document retrieval system, 101: input unit, 102: graph structure creation unit, 103: similarity calculation unit, 104: output unit, 105: storage unit, 112: concept dictionary, 200: document retrieval system, 201: input unit, 202: processing unit, 203: memory unit, 204: database, 205: display unit, 206: transmission path, 210: document retrieval system, 212: transmission path, 213: memory unit, 216: transmission path, 217a: communication unit, 217b: communication unit, 218: processing unit, 220: server, 230: terminal

The invention claimed is:

1. A non-transitory computer readable storage medium having instructions stored thereon which, when executed by one or more processors, cause the one or more processors to perform operations for document retrieval, the operations comprising:

inputting a first document;
creating a first graph structure from the first document;
storing a second graph structure;
vectorizing the first graph structure and the second graph structure;
comparing the vectorized first graph structure and the vectorized second graph structure to perform document retrieval;
supplying information; and
dividing the first document into a plurality of tokens;
wherein an edge of the first graph structure comprises a label,
wherein the label comprises the plurality of tokens, and
wherein, in a case where the label has an antonym, generating a new graph structure by reversing a direction of the edge of the first graph structure and replacing the label of the edge by the antonym.

2. The non-transitory computer readable storage medium according to claim 1, the operations further comprising giving a part of speech to a token.

3. The non-transitory computer readable storage medium according to claim 1, the operations further comprising:
performing a modification analysis, and
wherein the processing unit is configured to combine some of the tokens in accordance with a result of the modification analysis.

4. The non-transitory computer readable storage medium according to claim 1, the operations further comprising replacing a token having a representative word or a superordinate by the representative word or the superordinate.

5. The non-transitory computer readable storage medium according to claim 1, wherein the second graph structure is created in the processing unit, from a second document.

6. The non-transitory computer readable storage medium according to claim 1, the operations further comprising vectorizing the first graph structure and the second graph structure using Weisfeiler-Lehman Kernels.

7. The non-transitory computer readable storage medium according to claim 2, the operations further comprising, in a case where a part of speech given to a first token is a noun and a part of speech given to a second token that is placed right before the first token is an adjective, combining the second token to the first token.

8. The non-transitory computer readable storage medium according to claim 2, the operations further comprising, in a case where a part of speech given to a third token and a part of speech given to a fourth token that is placed right after the third token are each a noun, combining the third token to the fourth token.

* * * * *